United States Patent [19]
Klimek

[11] 3,858,610
[45] Jan. 7, 1975

[54] RELAY VALVE
[75] Inventor: Boleslaw Klimek, Des Plaines, Ill.
[73] Assignee: The Berg Manufacturing Company, Des Plaines, Ill.
[22] Filed: May 29, 1973
[21] Appl. No.: 364,306

[52] U.S. Cl. ................................ 137/627.5, 303/40
[51] Int. Cl. ............................................ F16k 31/12
[58] Field of Search ..................... 137/627.5; 303/40

[56] References Cited
UNITED STATES PATENTS

| | | | |
|---|---|---|---|
| 2,937,052 | 5/1960 | Gates | 137/102 X |
| 2,985,490 | 5/1961 | Gates | 303/40 |
| 3,115,371 | 12/1963 | Valentine | 303/40 X |
| 3,181,917 | 5/1965 | Dobrikin et al. | 303/40 |
| 3,752,190 | 8/1973 | Brake | 137/627.5 |

Primary Examiner—Robert G. Nilson

[57] ABSTRACT

A relay valve for use in a vehicle air brake system includes a movable piston and a movable shuttle controlling the flow of air pressure between a supply port, a delivery port and an exhaust port. The piston has a seal in alignment with a seal on the shuttle, which seals are effective, when the piston has closed upon the shuttle, to create generally equal and opposite air pressure responsive areas on the piston to balance it within the valve. In like manner, the shuttle has spaced seal members, generally aligned and generally of the same diameter, to create equal and opposite air pressure responsive areas on the shuttle to balance the shuttle within the valve. both the shuttle seal members and the seal members providing generally equal air pressure responsive areas on the piston are generally in alignment and generally of the same diameter.

1 Claim, 2 Drawing Figures

RELAY VALVE

SUMMARY OF THE INVENTION

The present invention relates to a relay valve for use in a vehicle air brake system and has particular relation to a relay valve having improved modulation and valve sensitivity.

Another purpose is a valve construction of the type described in which the movable members within the valve have sealing areas creating generally equal and opposite air pressure responsive areas on the movable members.

Another purpose is a relay valve of the type described in which the piston and shuttle are pressure balanced.

Another purpose is a relay valve of the type described in which portions of the valve piston and shuttle have curved surfaces to provide increased air flow characteristics within the valve.

Another purpose is a relay valve in which the reactive areas on the movable members have a increased diameter over previous valves of the same type to provide increased valve sensitivity.

Another purpose is a relay valve of the type described which is smaller in size but yet has increased flow characteristics.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

Figure 1:
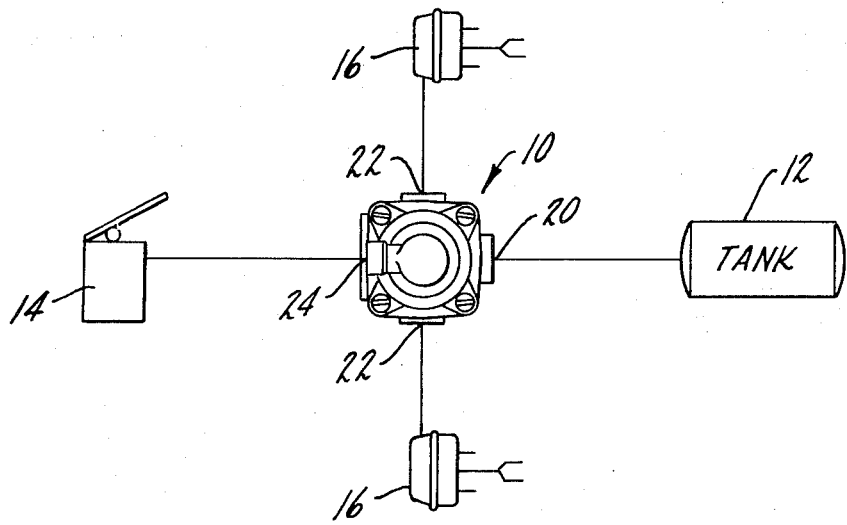
FIG. 1 is a diagrammatic illustration of the relay valve disclosed herein within a vehicle air brake system.

In FIG. 1, a relay valve is indicated at 10 and is connected to a tank 12 and a valve operator 14. The two delivery ports of the relay valve 10 are each connected to brake cylinders 16. In operation, a signal from the valve operator 14 is effective to open the relay valve 10 to cause air pressure from the tank 10 to flow to the two brake chambers 16.

Figure 2:
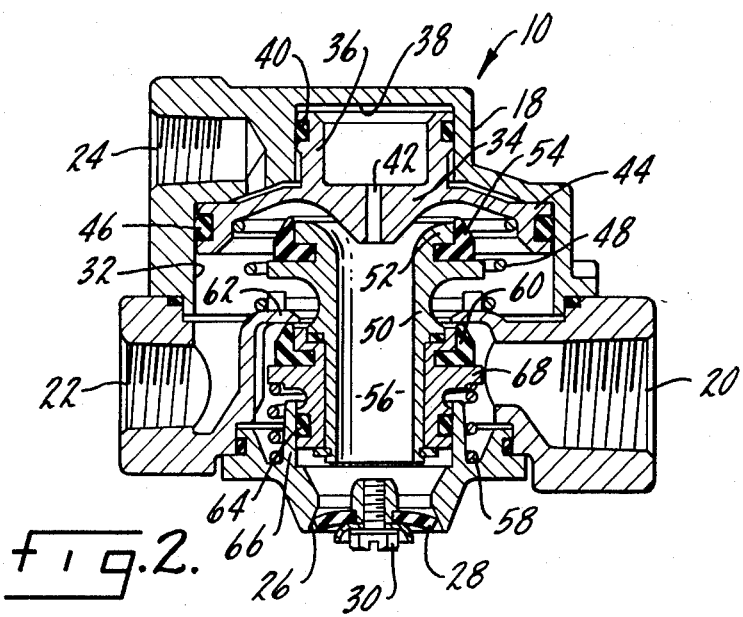
FIG. 2 is an axial section through a relay valve of the type described herein.

The details of the relay valve 10 are shown in FIG. 2. A housing 18 has a supply port 20, a pair of delivery ports, one of which is indicated at 22 in FIG. 2, and a service port 24. An exhaust port 26 is positioned at the bottom of the valve and may be closed by a conventional flapper valve 28 connected to the housing 18 by means of a fastener 30.

The supply port 20, delivery port 22 and service port 24, as well as the exhaust port 26, all open into a central chamber 32. Movable within the chamber 32 is a piston 34 having an upper cylindrical portion 36 which fits within a cylindrical portion 38 of the chamber 32. A seal ring 40 positioned on the outside of the cylindrical portion 36 seals against the wall of the housing 18. A bleed port 42 connects chamber portion 38 with chamber 32.

The piston 34 has a portion 44 of substantially greater diameter than portion 36 which carries a seal ring 46 at its outer periphery sealing against the wall of chamber 32. The upper surface of portion 44 of piston 34 is in communication with service port 24 to the effect that when air pressure is present at port 24, piston 34 will be moved away from the service port. A coil spring 48 normally biases piston 34 to the position of FIG. 2.

Positioned below piston 34 is a shuttle 50 having an upper portion 52 mounting a seal member 54, with the seal member 54 being positioned to form a seal with the lower surface of piston 34. It is important to note that the diameter of seal member 54 is generally the same as that of seal ring 40 and both seal ring 40 and seal member 54 are generally concentrically aligned within housing 18.

The center of the shuttle 50 forms an air passage 56 which is in alignment with exhaust port 26, with the upper end of the air passage 56 being in communication with the delivery port 22 in the position of FIG. 2. A coil spring 58 bottoms against housing 18 and exerts an upward bias on shuttle 50 to hold it in the position of FIG. 2. A second shuttle seal member 60 is carried by the shuttle and forms a seal with an inwardly projecting ring-like portion 62 of the housing 18 so that the shuttle, in the position shown in FIG. 2, prevents communication between supply port 20 and delivery port 22. A second seal between the shuttle and housing 18 is formed by a seal ring 64 positioned at the lower outer surface of the shuttle and bearing against an inner upwardly-extending projection 66 of the housing, which projection is generally coaxially aligned with exhaust port 26. A laterally extending projection 68 on the shuttle is positioned intermediate seal ring 64 and seal member 60. Again, it is important to note that seal ring 64 and seal member 60 are generally coaxially aligned and have generally the same radius or diameter, thus insuring generally equal and opposite air pressure forces on the upper and lower surfaces of projection 68.

In operation, the signal from the valve operator 14, for example by applied foot pressure from the vehicle driver, causes an air pressure signal to be applied to service port 24. The application of air pressure at this point creates a downward force upon piston 34, causing it to move from the position of FIG. 2, to close upon shuttle seal member 54. This stops communication between delivery port 22 and exhuast port 26. Further movement of piston 34 in response to pressure at the service port will cause piston 34, as well as shuttle 50, to move downward within the valve housing to a position where the shuttle will bottom upon the surface of the housing adjacent exhaust port 26. As both the piston and the shuttle move away from the position of FIG. 2, both spring 48 and spring 58 are compressed.

As soon as the shuttle has moved from the position of FIG. 2, air pressure from tank 12, as presented at supply port 20, will flow to delivery port 22. It should be noted that there will be generally equal air pressure created forces applied to opposite sides of piston 34 because of the general alignment of seal member 54 and seal ring 40. The lower side of piston 34 will receive air pressure from tank 12, whereas the upper side will receive air pressure from service port 24. Thus, the equal and opposite pressures will balance the piston within the housing 18. In like manner, once there is communication between supply port 20 and delivery port 22, the aligned seal members 60 and 64 on the shuttle also will provide equal and opposite pressure balancing surfaces because of laterally extending shuttle projection 68.

Thus, the shuttle will be pressure balanced, as will the piston. In this way the piston and shuttle are sensitive to small changes in pressure at the service port, thus providing increased valve modulation and sensitivity.

After release of pressure at service port 24, springs 48 and 58 will return piston 34 and shuttle 50 to the position of FIG. 2. In this position, delivery port 22 will again be connected to the flapper controlled exhaust port 26 for exhausting air pressure from the brakes.

It is important to note that not only are seal members 40 and 54 forming the pressure surfaces on the piston, and seal members 60 and 64 forming the pressure surfaces on the shuttle, in alignment, but all four seal members are in alignment, one with another. In addition, and of substantial significance, is the fact that the seal members have substantially greater diameter than previous seal member in valves of this general type. In this manner valve sensitivity is substantially increased over previous similar constructions.

Of additional importance in the construction shown is the fact that the lower surface of the piston is curved, as is the upper surface of the shuttle, thus forming air passages of smooth configuration. Such smooth configuration provides increased flow characteristics through the valve, not only by providing larger air passages, but also by providing less turbulence and smoother air flow through the valve.

Whereas the preferred form of the invention has been shown and described herein, it should be realized that there may be many modifications, substitutions and alterations thereto.

The embodiments of the invention in which an exclusive property or privilege is claimed are defined as follows:

1. A relay valve including a housing having a supply port, a delivery port, a service port and an exhuast port, a piston movable in said housing in response to air pressure at said service port, a spring in said housing normally biasing said piston toward said service port, a seal member on said piston forming a seal with a portion of said housing, a shuttle movable in said housing, said housing having a portion forming a valve seat between said supply and delivery ports, axially spaced seal members having generally the same diameter fixed to said shuttle, spring means positioned about said shuttle and seated against said housing for normally biasing one of said shuttle seal members toward a closing position with said valve seat to close communication between said delivery and supply ports, said housing including a wall concentric with said shuttle and positioned within said shuttle spring means, said other shuttle seal member being in sealing contact with said wall, with said axially spaced shuttle seal members forming balancing air pressure responsive areas on said shuttle, a third seal member at one end of said shuttle and positioned for contact with one side of said piston and having generally the same diameter as said piston seal member, said shuttle having an interior passage communicating with said exhaust port and with said delivery port when said third shuttle seal member is spaced from said one side of said piston, said one side of said piston having a passage forming curved surface portion projecting toward and positioned to extend within said shuttle interior passage, the shuttle end adjacent said shuttle end seal member having a similar curved surface communicating with said shuttle interior passage, with the combination of said curved surfaces providing a smooth non-turbulent air passage between said delivery and exhaust ports, air pressure at said service port moving said piston toward said shuttle end seal member with closing of said piston upon said shuttle end seal member closing communication between said delivery and exhuast ports, further movement of said piston responsive to air pressure at said service port moving said shuttle seal member away from said seat to open communication between said supply and delivery ports, with said shuttle end seal member and piston seal member creating generally equal air pressure responsive areas on said piston.

* * * * *